US007763086B2

(12) United States Patent
Woods et al.

(10) Patent No.: US 7,763,086 B2
(45) Date of Patent: Jul. 27, 2010

(54) HYDROGEN PURIFICATION PROCESS AND SYSTEM

(75) Inventors: Richard Root Woods, Irvine, CA (US); Brook Forest Porter, Playa Vista, CA (US); Kandaswamy Duraiswamy, Huntington Beach, CA (US)

(73) Assignee: Intelligent Energy, Inc., Long Beach, CA (US)

( * ) Notice: Subject to any disclaimer, the term of this patent is extended or adjusted under 35 U.S.C. 154(b) by 0 days.

(21) Appl. No.: 12/205,171

(22) Filed: Sep. 5, 2008

(65) Prior Publication Data

US 2009/0041641 A1  Feb. 12, 2009

Related U.S. Application Data

(62) Division of application No. 11/536,279, filed on Sep. 28, 2006, now Pat. No. 7,439,273.

(60) Provisional application No. 60/781,616, filed on Mar. 10, 2006.

(51) Int. Cl.
*B01J 7/00* (2006.01)

(52) U.S. Cl. ............................ 48/61; 48/127.9; 48/128; 422/187; 422/188; 422/189; 422/190; 422/211; 423/651; 423/248; 423/215.5; 423/580.1; 252/373

(58) Field of Classification Search .................. 48/61, 48/127.9; 429/17, 19
See application file for complete search history.

(56) References Cited

U.S. PATENT DOCUMENTS 7,276,095 B2  10/2007  Gittleman et al.

(Continued)

OTHER PUBLICATIONS

Later publication of international search report (A3 18/2009).

(Continued)

*Primary Examiner*—Alexa D. Neckel
*Assistant Examiner*—Kaity V. Handal
(74) *Attorney, Agent, or Firm*—Mark Krietzman; Mark Bently; Technology Law Group; Luce, Forward, Hamilton & Scripps, LLP

(57) ABSTRACT

A hydrogen generation system is disclosed that includes a fuel reforming reactor generating a hydrogen-rich reformate gas at a temperature greater than 150 C, a pressure swing adsorption (PSA) hydrogen purification unit that separates the reformate gas into a relatively pure hydrogen stream and an off-gas stream, and a catalytic reactor down stream of the PSA unit that converts carbon monoxide (CO) and hydrogen ($H_2$) contained in the relatively pure hydrogen stream into methane ($CH_4$) and water vapor ($H_2O$). The method of purification involves generating a hydrogen-rich reformate gas at a temperature greater than 150 C in a fuel reforming reactor, separating the reformate gas into a relatively pure hydrogen stream and an off-gas stream in a pressure swing adsorption (PSA) hydrogen purification unit, and converting carbon monoxide (CO) and hydrogen ($H_2$) contained in the relatively pure hydrogen stream into methane ($CH_4$) and water vapor ($H_2O$) in a catalytic reactor down stream of the PSA unit. The hydrogen can be further purified by including a secondary purification stage downstream of the PSA unit and the catalytic reactor wherein the secondary purification stage has a water adsorbent material bed that adsorbs the water vapor $H_2O$ and a hydrogen absorbent material downstream of the water absorbent material that absorbs hydrogen gas preferentially, thus concentrating the non-hydrogen components, such as $CH_4$, into an exhaust stream that exits the bed, wherein the absorbed hydrogen gas is then desorbed to create an exiting very pure hydrogen stream.

3 Claims, 5 Drawing Sheets

U.S. PATENT DOCUMENTS

2003/0046867 A1    3/2003  Woods et al.
2005/0193627 A1    9/2005  Zhang et al.
2005/0232856 A1*  10/2005  Stevens et al. .............. 423/651
2006/0137245 A1*   6/2006  Kenefake et al. ............... 48/61

OTHER PUBLICATIONS

International Preliminary Report on Patentability Chapter I; Written Opinion of the International Search Authority, Mar. 20, 2009.

* cited by examiner

| Table 5.A Inlet Reformate Composition | | | |
|---|---|---|---|
| Assumption: Typical Liq. HC Reformate | | | |
| | moles | ppm | % |
| H2 | 74 | 740000 | 74.0 |
| CO | 2 | 20000 | 2.0 |
| CO2 | 21 | 210000 | 21.0 |
| CH4 | 2.9 | 29000 | 2.9 |
| H2O | | | |
| Other | 0.1 | 1000 | 0.1 |
| moles | 100 | | |
| % | | 100.0 | 100.0 |

| Table 5.B After PSA | | | |
|---|---|---|---|
| Assumption: 70.0% PSA H2 Recovery | | | |
| | moles | ppm | % |
| H2 | 51.8000 | 998987 | 99.899 |
| CO | 0.0104 | 200 | 0.020 |
| CO2 | 0.0005 | 10 | 0.001 |
| CH4 | 0.0415 | 800 | 0.080 |
| H2O | 0.0000 | 0 | 0.000 |
| Other | 0.0002 | 3 | 0.000 |
| moles | 51.85 | | |
| % | 51.8525 | 100.0 | |

| Table 5.C After Methanation Reaction | | | |
|---|---|---|---|
| Assumption: 99.975% Conversion | | | |
| | moles | ppm | % |
| H2 | 51.76682 | 998766.5 | 99.877 |
| CO | 2.64E-06 | 0.051 | 0.000 |
| CO2 | 1.32E-07 | 0.003 | 0.000 |
| CH4 | 0.0524 | 1010.4 | 0.101 |
| H2O | 0.0114 | 220.0 | 0.022 |
| Other | 0.0002 | 3.001 | 0.000 |
| moles | 51.83 | | |
| % | | 100.0 | |

| Table 5.D After H2O Absorption | | | |
|---|---|---|---|
| Assumption: 99.990% Adsorption | | | |
| | moles | ppm | % |
| H2 | 51.7668 | 998986.3 | 99.899 |
| CO | 0.0000 | 0.051 | 0.000 |
| CO2 | 0.000000 | 0.003 | 0.000 |
| CH4 | 0.0524 | 1010.6 | 0.101 |
| H2O | 0.0000 | 0.022 | 0.000 |
| Other | 0.0002 | 3.002 | 0.000 |
| moles | 51.82 | | |
| % | | 100.0 | |

| Table 5.E After H2 Absorption | | | |
|---|---|---|---|
| Assumption: 95.0% H2 Absorption | | | |
| | moles | ppm | % |
| H2 | 2.59 | 980109.7 | 98.011 |
| CO | 0.0000 | 1.000 | 0.000 |
| CO2 | 0.0000 | 0.050 | 0.000 |
| CH4 | 0.0524 | 19829.9 | 1.983 |
| H2O | 0.0000 | 0.432 | 0.000 |
| Other | 0.0002 | 58.904 | 0.006 |
| moles | 2.64 | | |
| % | | 100.0 | |

| Table 5.F After H2 Desorption | | | |
|---|---|---|---|
| Assumption: 150 Times volume ratio | | | |
| | moles | ppm | % |
| H2 | 49.1785 | 999992.9 | 99.9993 |
| CO | 0.0000 | 0.000 | 0.0000 |
| CO2 | 0.0000 | 0.000 | 0.0000 |
| CH4 | 0.0003 | 7.099 | 0.0007 |
| H2O | 0.0000 | 0.000 | 0.0000 |
| Other | 0.0000 | 0.021 | 0.0000 |
| moles | 49.18 | | |
| % | | 100.0 | |

66.5% Net Recovery
99.9993 % Purity

FIG. 5

HYDROGEN PURIFICATION PROCESS AND SYSTEM

CROSS-REFERENCE TO RELATED APPLICATIONS

This application is a divisional of U.S. application Ser. No. 11/536,279, filed Sep. 28, 2006, which claims the benefit of and priority to U.S. Provisional Application Ser. No. 60/781,616, filed Mar. 10, 2006, the contents of which are incorporated by reference herein in their entirety.

BACKGROUND

1. Field

This disclosure relates to improving the purity of hydrogen gas using a secondary hydrogen purification method downstream of a primary hydrogen pressure swing adsorption unit.

2. General Background

A hydrogen generation unit (HGU) is a combination of thermo-chemical processes that convert a fuel-steam mixture into a hydrogen-rich gas mixture typically composed of hydrogen ($H_2$), carbon monoxide (CO), carbon dioxide ($CO_2$), methane ($CH_4$), water vapor ($H_2O$) and other gases depending on the composition of the fuel feedstock. Typically this mixture is known as reformate. For many applications this reformate stream is then passed to a hydrogen purification unit in which 60% to 90% of the hydrogen is separated into a relatively pure hydrogen stream (99+% $H_2$) and an off-gas stream consisting of the other species in the reformate mixture. One typical method used to purify the reformate is a pressure swing adsorption (PSA) unit, which consists of a series of bed filled with adsorbent material (typically but not limited to zeolites). As the pressurized reformate flows through the bed gaseous species adsorb on to the active surfaces. Since the $H_2$ is the least strongly adsorbed species in the reformate stream, a pure $H_2$ gas exits the bed. After a period of time when the adsorbent sites begin to become saturated, the feed gas is removed and the bed is depressurized forcing the adsorbed species to desorb and exit the bed as the off-gas stream. By cycling several beds through this pressurization and depressurization cycle a continuous $H_2$ purification process is created. As the capacities of the beds are pushed to their limits with higher flow rates and faster cycle times, non-hydrogen gas species begin to contaminate the relatively pure $H_2$ gas stream. Typically, the species of concern are the other gases in the reformate stream such as $CH_4$, CO, and $CO_2$.

Of the non-hydrogen species typically in the reformate feed to the PSA, $H_2O$ and $CO_2$ are strongly adsorbed onto the surfaces of the zeolites and CO and $CH_4$ are weakly adsorbed. As a result the relatively pure hydrogen stream exiting the PSA typically has CO and $CH_4$ as the primary contaminates. In fuel cell and hydrogen refueling station applications the most critical of these contaminates is the CO, because is causes performance degradation of the fuel cell or metal hydride hydrogen storage units. $CH_4$ is relatively non-reactive in the fuel cell and metal hydride materials, and therefore, does not cause performance degradation. It is beneficial to include a reactor between the PSA and the fuel cell that converts the CO back into $CH_4$. This reactor allows the capacity of the PSA to be increased substantially without impacting performance of fuel cell units downstream.

One reaction mechanism that achieves this is known as methanation, which is the reverse of the steam reforming reactions. Typically in methanation reactors, a catalyst is used and ruthenium based catalysts have proven to be very effective, although other catalysts such as nickel, platinum, etc. can be used. For these catalysts to be effective the temperature of the catalyst must be greater than 150 C and preferably greater than 190 C.

$$CO+3H_2 \rightarrow CH4+H_2O+Heat \qquad \text{E-1 Primary}$$

$$CO_2+4H_2 \rightarrow CH4+2H_2O+Heat \qquad \text{E-2 Secondary}$$

Methanation reactors have been integrated into hydrogen generation systems in the prior art, but typically they have been used upstream of the PSA unit to minimize the CO concentration entering the PSA unit. Typically, this upstream location is used because the reformate gas is at the appropriate temperature range to maintain the catalyst activity. One issue with this art is the secondary reaction identified above, where $CO_2$ is also converted into $CH_4$ since the $CO_2$ concentration is typically 20% in comparison to CO concentrations in the 2 to 4% range. To manage the methanation reaction a tight temperature range is preferably maintained in the catalytic bed which promotes the reaction of CO but does not promote the reaction of the secondary reaction with $CO_2$. Not only is this a source of process inefficiency, but it can also result in thermal run-away in which all the $CO_2$ is reconverted back into $CH_4$. Therefore a system and method are needed which alleviates these inefficiencies and precludes thermal runaway from occurring.

SUMMARY OF THE DISCLOSURE

The present disclosure is directed to a hydrogen generation system and method that fundamentally includes operations of generating a hydrogen-rich reformate gas at a temperature greater than 150 C in a fuel reforming reactor, separating the reformate gas into a relatively pure hydrogen stream and an off-gas stream in a pressure swing adsorption (PSA) hydrogen purification unit, and converting low level concentrations of carbon monoxide (CO) contained in the relatively pure hydrogen stream into methane ($CH_4$) and water vapor ($H_2O$) in a catalytic reactor down stream of the PSA unit. Preferably the hydrogen generation method also includes positioning the catalytic reactor such that the temperature of the hydrogen-rich reformate gas maintains the temperature of the catalytic reactor.

Alternatively, or, in addition, the hydrogen generation system and method includes integrating the fuel reforming reactor with a combustion reactor that uses the off-gas stream to provide thermal energy to the fuel reforming reactor. Here the combustion reactor has a combustion exhaust gas at a temperature greater than 150 C, and includes positioning the catalytic reactor such that the temperature of the exhaust gas maintains the temperature of the catalytic reactor.

The hydrogen generation method and system may include a secondary purification stage downstream of the PSA unit and the catalytic reactor. The secondary purification stage has a water adsorbent material bed that adsorbs the $H_2O$ vapor; and concentrates non-hydrogen components into an exhaust stream exiting the bed by providing a hydrogen absorbent (or adsorbent) material downstream of the water absorbent material bed. Finally, the absorbed hydrogen gas is desorbed to generate a very pure hydrogen stream.

DRAWINGS

FIG. 5 is a set of tables showing predicted hydrogen production levels at various stages in the systems shown in FIGS. 1, 2, and 4.

DETAILED DESCRIPTION

Figure 1:
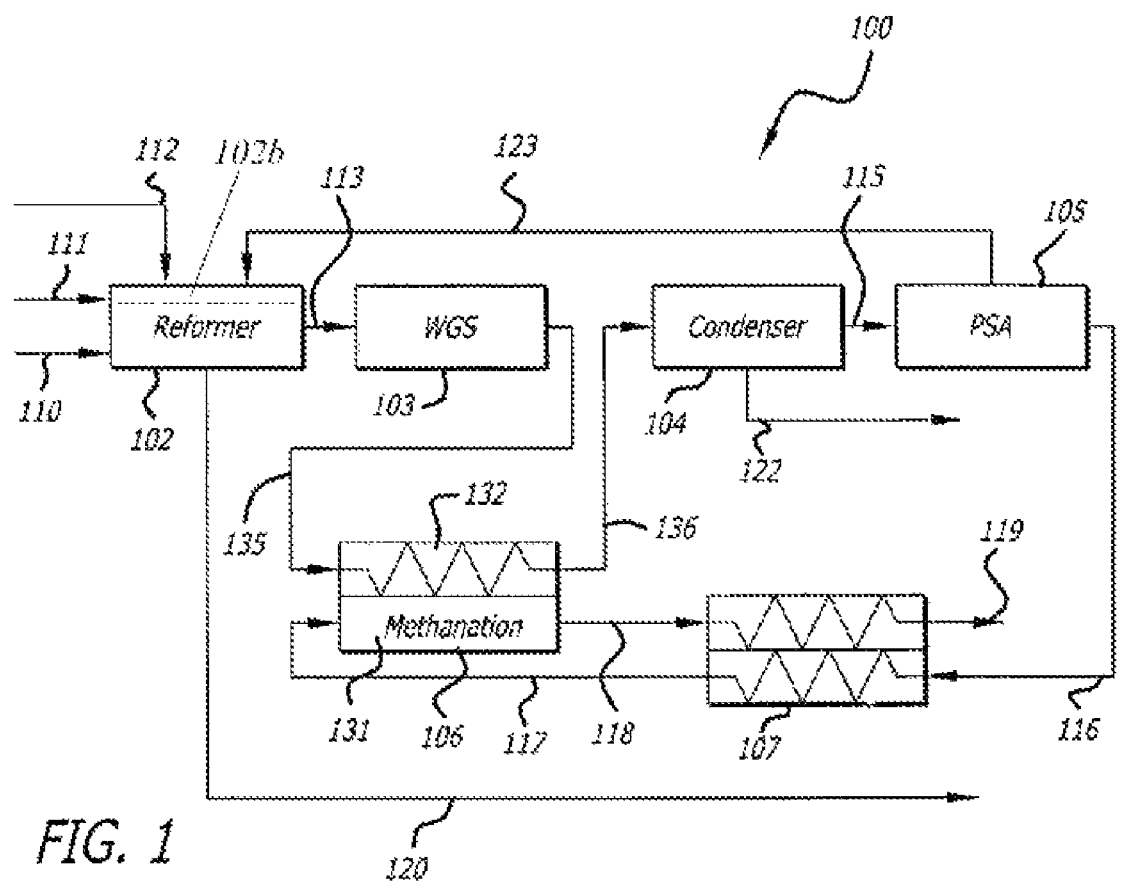
FIG. 1 illustrates one embodiment of a system of the disclosure in which thermal energy of the reformate stream is used to maintain the catalyst at optimum conditions.
Figure 2:
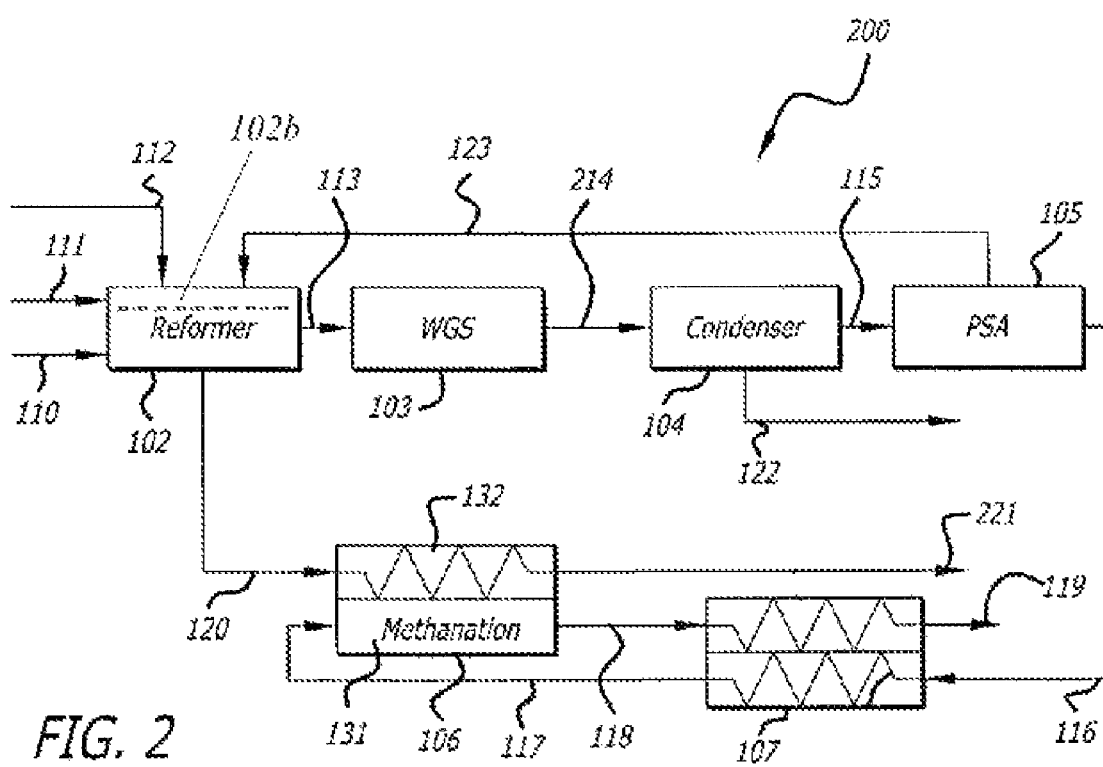
FIG. 2 illustrates a second embodiment of the system in which thermal energy of the combustion exhaust gas is used to maintain the catalyst at optimum conditions.

FIG. 1 illustrated one exemplary embodiment of a system in accordance with the disclosure in which a methanation reactor is integrated into a system based on steam reformation and PSA purification. Basically the methanation reactor is integrated into the system such that the reformate gas stream exiting the water gas shift (WGS) reactor at a temperature greater than 150 C is used as the thermal energy source to maintain the methanation reactor at its optimum temperature. Typically the exit temperature of the WGS exit stream is in the range of 150 C to 400 C, and more preferably in the range of 200 C to 300 C The embodiment shown in FIG. 2 is similar to that of FIG. 1 except that combustion exhaust gas is used to maintain temperature in the methanation reactor. Both of these embodiments provide the unique advantage of the disclosure that places the methanation reactor downstream of the PSA. Since most if not all the $CO_2$ is removed from the relatively pure hydrogen product stream from the PSA, there is no need for tight temperature control because the concentration of reactants (CO and $CO_2$) are relatively low (typically below 1000 ppm) and the purification goal is to convert all these reactant species into $CH_4$. Therefore, there is no upper limit to the catalytic reactor's temperature, because the concentration of $CO_2$ in the relatively pure hydrogen stream is insufficient to allow thermal runway of the methanation reactor.

Now specific reference is made to the first embodiment of the system shown in FIG. 1. This embodiment of the hydrogen generation system 100 consists of a reformer 102, WGS reactor 103, condenser 104, PSA 105, methanation reactor 106, and hydrogen gas recuperative heat exchanger 107. The reformer 102 has an integrated combustor section and steam reforming section (not detailed). Each reactor section or process in the reformer 102 has an optimum temperature range based on the specific catalysts and processes that are occurring.

The combustion section (102b), herein after the combustion section, receiving air 112 and PSA off gas 123 which is typically 40 to 60% hydrogen reacts this fuel air mixture generating heat and operating at a temperature in the 700 to 950 C range. The reformer 102 typically operates in the 650 to 900 C range or at a temperature 50 to 100 C cooler than the combustion section within the reformer 102 to promote the transfer of heat from the combustion section to the reformation section. The WGS typically operates in the 500 to 250 C range depending on the specific catalysts. The PSA's temperature range is typically in the 40 to 80 C range, and requires no liquid water in the feed. Therefore the condenser 104 is used to cool and dry the reformate stream 136 and can include a reheat function to ensure that the reformate stream 115 entering the PSA 105 has a dew point less than the dry bulb temperature. The ideal methanation reactor temperature is above 190 C Since the PSA operating temperature is typically lower than the methanation temperature, methanation reactors are typically not utilized downstream of the PSA.

Fuel 110 and water vapor or steam 111 enters the steam reforming section of the reformer 102 where the steam-fuel mixture is converted into a pre-WGS reformate stream 113 containing $H_2$, CO, $CO_2$, $H_2O$, $CH_4$, and other trace species. This stream 113 enters the WGS 103 where additional CO is reacted with $H_2O$ to form $H_2$ and $CO_2$ creating the reformate stream 135 that exits the WGS 103. In some alternative embodiments the reformer 102 and WGS 103 can be integrated into a single assembly, and in others the WGS can be minimized or even eliminated. The thermal energy contained in the reformate stream 135 is used to heat the methanation reactor 106 by indirect transfer from heat exchanger surface 132 to methanation catalyst 131. The reformate stream 136 flows to the condenser 104 in which thermal energy is removed to manage the inlet PSA 105 temperature and to condenser water from the reformate mixture. The condensate water 122 is removed. The drier reformate gas 115 is passed to the PSA 105 in which it is separated into a relatively pure hydrogen stream 116 and an off-gas stream 123.

The relatively pure hydrogen stream 116 is raised in temperature by the recuperative heat exchanger 107. The temperature of the relatively pure hydrogen stream 116 is dependant on the sizing and configuration of the recuperative heat exchanger 107, but typically temperatures in the 100 C to 150 C are achievable depending on the temperature of the methanation reactor. The hotter relatively pure hydrogen stream 117 then enters the methanation reactor 106 in which any CO and $CO_2$ contaminates are reacted with $H_2$ to form $CH_4$ and $H_2O$. The temperature of the methanation reactor 106 is managed by the indirect heat transfer with the reformate stream 135 and the heat exchange surface 132. Although the methanation reactions (E-1 and E-2) are exothermic, the heat generated is not sufficient to control the temperature of the methanation reactor 106 because the concentrations of CO and $CO_2$ in the feed stream 117 are relatively low, typically less than 1000 ppm or 0.1%. The low CO concentration, relatively pure hydrogen stream 118 exits the methanation reactor 106 and provides thermal energy to the recuperative heat exchanger 107. Typically the temperature of the exit hydrogen stream 119 is in the range of 100 to 160 C depending on the surface area and design of heat exchanger 107.

The advantage of this system 100 and the method of its operation is to produce a relatively pure hydrogen exit stream 119 in which the only impurities are $CH_4$, $H_2O$ and other non-reactive species, such as nitrogen, argon, etc. The reactive species CO and $CO_2$ have been converted back into $CH_4$, which is non-reactive at the operating temperatures of a proton exchange membrane (PEM) fuel cell. This relatively pure hydrogen exit stream 119, for example, can be sent directly to a PEM fuel cell for power generation. The PEM fuel cell consumes the hydrogen to generate power and the $CH_4$ and other non-reactive species will build up concentration in the dead headed flow path. Periodically a valve will open forcing the collected $CH_4$ and other non-reactive species out of the fuel cell to maintain performance while achieve 99% hydrogen utilization in the fuel cell.

FIG. 2 illustrates a second embodiment 200 of the system in accordance with the present disclosure. In this embodiment 200 like numbers are used as in FIG. 1 for the same components. Embodiment 200 differs specifically from system 100 in that exhaust gas 120 from the reformer 102 feeds directly into and through the heat exchanger surface 132 rather than the discharge of the WGS 103 feeding the heat exchanger 132. Thus the thermal energy used to maintain the temperature of the methanation reactor 106 is energy from the exhaust gas 120 from the combustion section of the reformer 102. Since this temperature source is used, the reformate stream 214 from the WGS 103 flows directly into the condenser 104. The combustion exhaust 120 from the reformer 102 is typically used for feed air 112 preheating and exits the reformer 102 in the temperature range of 150 to 300 C depending on the preheating characteristics.

Figure 3:
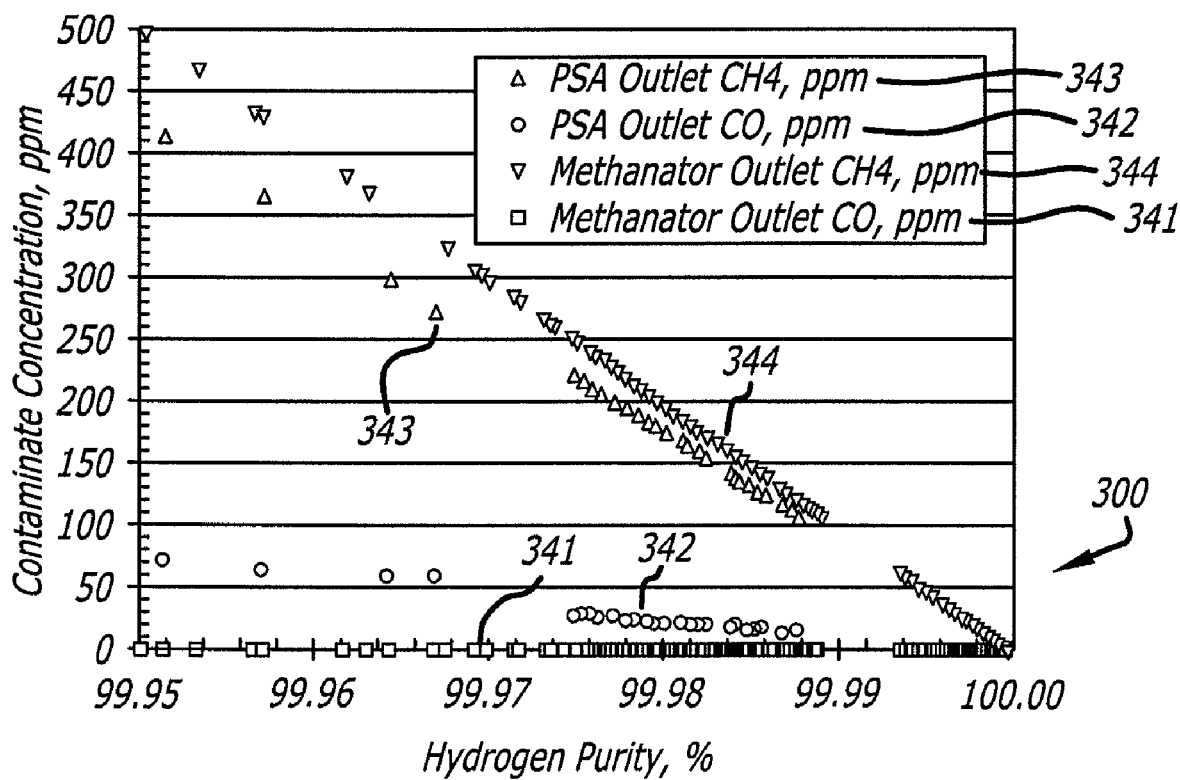
FIG. 3 is a graph that illustrates test data collected on a hydrogen generation unit shown in FIG. 1.

FIG. 3 illustrated actual test data graph 300 collected from a HGU with a methanation reactor in accordance with the present disclosure. The HGU was an integrated steam reformer and water gas shift reactor system 100 as illustrated in FIG. 1. The reformate gas 135 was used to provide the thermal energy for the methanation reactor 106 prior to flowing to the condenser 104 and the PSA unit 105. The CO and $CH_4$ concentration after the PSA unit 105 and after the methanation reactor 106 are plotted. The relatively pure hydrogen stream 119 exiting the test hardware had a CO concentration of less than 0.5 ppm as illustrated by the open square data set 341 and a $CH_4$ concentration as illustrated by the downwardly pointed open triangle data set 344. Both data sets are plotted with hydrogen purity as the x-axis. The open circle data set 342 illustrates the CO concentration in stream 116 exiting the PSA 105 and the upwardly pointed open triangle data set 343 illustrates the $CH_4$ concentration in stream 116. This data set indicates the increase in $CH_4$ concentration after the methanation reactor 106 which corresponds to the decrease in CO concentration.

In some refueling station and industrial gas applications a pure hydrogen product of greater than 99.9% is required. To achieve this level of purity, typically the PSA unit is increased in size and the hydrogen recover in the PSA unit is decreased until there are very few non-hydrogen species in the PSA product gas 116. A hydrogen concentration of 99.99+% is equivalent to less than 100 ppm non-hydrogen concentration and a 99.999+% is equivalent to less than 10 ppm non-hydrogen concentration. This requirement can force the PSA unit 105 to be large and costly.

The systems 100 and 200 illustrated in FIG. 1 and FIG. 2 can also be used in these applications with an additional secondary purification system 400 positioned downstream of the relatively pure hydrogen exit stream 119. The secondary purification system 400 allows the primary PSA unit 105 to be decreased in size and cost and operated at a faster cycle time, which also helps decrease pressure pulsations in both the off-gas and product gas. The secondary purification subsystem 400 is illustrated in FIG. 4.

The objective of subsystem 400 is to purify the reformate stream with a PSA unit 105 allowing $CH_4$, CO, and $CO_2$ as contaminates at concentrations less the 0.1% or 1000 ppm. This allows the PSA unit 105 to be considerably downsized and a very rapid cycle can be used to maximize the capacity of the PSA unit 105. Downstream of the PSA unit 105 a methanation reactor 106 as indicated in FIG. 1 or 2 is used to convert the CO and $CO_2$ into additional $CH_4$ and $H_2O$. Downstream of the methanation reactor 106 this hydrogen stream is cooled and passed through a desiccant material to remove the water vapor produced in the methanation reactor 106. This dry stream is then passed into a $H_2$ absorbent bed such as a metal hydride in which the $H_2$ is absorbed into the material and stored for later release.

Removal of the water vapor and CO is important in this secondary purification subsystem 400, because these species can damage the performance and endurance of the metal hydride bed. The absorbent bed is designed to have a high length over width ratio such that as the hydrogen gas is adsorbed the $CH_4$ and other non-reactive, non-condensable species are concentrated as they move down the bed. Finally, the gases exit the bed as a hydrogen-rich mixture with higher concentrations of $CH_4$ and other non-reactive species. These gases are vented from the secondary purification system 400 and may be returned to the combustion section of the reformer 102. Valves in the system 400 are used to isolate the beds and to open the $H_2$ absorbent to the product $H_2$ supply line. The absorbed $H_2$ is desorbed resulting in a very pure $H_2$ stream, typically in the 99.995+% range because the only non-hydrogen is the contaminate $CH_4$ and other non-reactive, non-condensable species in the gas volume around the absorbent material.

Figure 4:
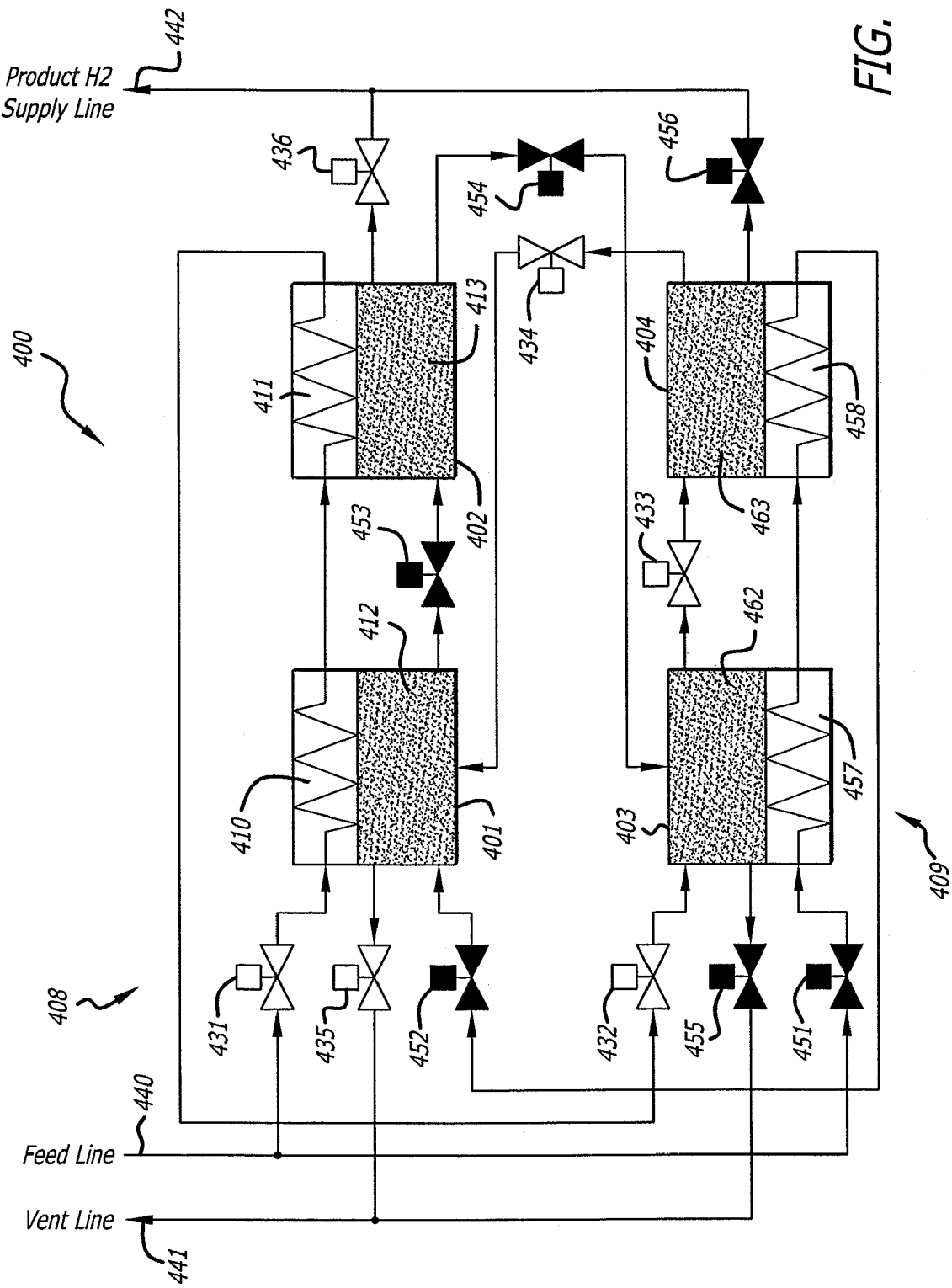
FIG. 4 illustrates an exemplary system in which a secondary hydrogen purification process is added downstream of the methanation reactor in either of the systems shown in FIG. 1 or 2.

In reference to FIG. 4 one embodiment of the secondary hydrogen purification system 400 consists of four beds, first desiccant bed 401, first $H_2$ absorbent bed 402, second desiccant bed 403 and second $H_2$ absorbent bed 404. The system 400 also has a series of valves that manage the flow of relatively pure hydrogen stream from the methanation reactor 106 and feed line 440 to the product hydrogen supply line 442 and the vent line 441. In this embodiment first and second parallel paths 408 and 409 are illustrated which cycle on and off in sequence to create a continuous process. Other embodiments may include three or more parallel paths to optimize purity and process integration. The open valves of the first parallel path 408 are shown as white or open symbols, while the closed valves of the second parallel path 409 are shown as dark or solid symbols. The valves are shown as on-off solenoid valves, but could also be rotary valve assemblies similar to the valves used in a rapid cycle PSA unit. Rotary valves assemblies provide advantages of reliability, lower cost, and simple process control.

Process gases from the methanation reactor 106 flow into the system 400 through supply line 440. In FIG. 4 the first parallel path 408 supply valve 431 is open allowing the hot gas from the methanation reactor 106 to enter the first heat exchanger coil 410 of first desiccant bed 401, while second parallel path supply valve 451 is closed. The hot gas from the methanation reactor 106 transfers heat to the desiccant material 412 of desiccant bed 401. The gas flows from coil 410 to second heat transfer coil 411 embedded in first $H_2$ absorbent bed 402 again transferring heat to the first $H_2$ absorbent material 413. Absorbed $H_2$ from the prior cycle in the first material 413 is desorbed and flows through open first exit valve 436 and out of the system through product line 442.

$H_2$ desorption is endothermic which decreases the temperature of the first absorbent material 413 and helps transfer heat from second coil 411 cooling the gas temperature in coil 411. The gas flows from the second coil 411 through open valve 432 and into second desiccant bed 403 and past the second desiccant material 462 which adsorbs any water vapor in the gas stream generated by the methanation reactions in bed 106. The dry hydrogen rich gas flows through open valve 433 and into second $H_2$ absorbent bed 404 and $H_2$ absorbent material 463. The hydrogen in the stream is absorbed as the gas flow through second absorbent bed 463 thereby increasing the concentration of $CH_4$ and other non-reactive species in the process flow. This gas then exits the second $H_2$ absorbent bed 404 through open valve 434 and into first desiccant bed 401 in contact with first desiccant material 412. The heat transferred from first coil 410 causes the adsorbed water vapor in first desiccant material 412 to evolve and flow out of the system through open valve 435 to system vent 441.

Once the second desiccant material 462 or the second absorbent material 463 nears saturation the process cycle is reversed and flow is diverted through the second parallel path 409 by closing the open valves 431, 432, 433, 434, 435, and 436 and opening the closed valves 451, 452, 453, 454, 455, and 456. When the secondary parallel path 409 is active, heat transferred in third coil 457 and fourth coil 458, while water vapor is adsorbed in first desiccant material 412 and hydrogen is absorbed in first absorbent material 413. Similarly, product hydrogen is desorbed from second absorbent material 463 flowing through valve 456 toward product line 442.

In one embodiment of the secondary purification system 400 the hydrogen absorbent material 413 and 463 is a metal hydride type material. The material absorbs $H_2$ molecules into the metal lattices and has the capacity to absorb approximately 150 to 300 times the volume of hydrogen at standard conditions in comparison to the volume of metal. Any absorbent or adsorbent materials can be used which preferentially remove $H_2$ gas from a mixture.

The method described is very simple in that all the open valves are closed and all the closed valves are open uniformly. More complex and potentially more effective cycles are embodied. For example the purge valve 434 positioned between the second $H_2$ absorbent material 463 and the first desiccant material 412 can be opened after the starting the process parallel path 408, to maintain the pressure of the process gases in absorbent material 463 and thereby, enhance the percentage of the process hydrogen gas in the flow stream that is absorbed in the material 463.

Similarly, the open valves of parallel path 408 can be closed except for purge valve 434 and exhaust valve 435 which are left open to allow a brief period during which process gases in the gas volumes of absorbent material 463 are purged due to depressurization and desorption of pure hydrogen. The pure hydrogen pushes any process gas with contaminates out through valve 434. After the brief period parallel path 463 valves are closed and process flow is initiated through parallel path 409. As a result the hydrogen gas allowed to flow through product valves 436 and 456 is extremely pure achieving purities one magnitude greater than without this delay.

An analytical model was developed to assess the performance characteristics and sensitivities of the process to the various parameters. One set of results from this model is shown in FIG. 5. This FIG. 5 is divided into six blocks of data. The first block (Table 5.A) shows a typical reformate composition entering the PSA primary hydrogen purification unit. The analysis was conducted for one multiple of 100 moles at this point, and the concentrations of gas species are shown in ppm and percent in the third and fourth column of each block of data, respectively.

The second block (Table 5.B) illustrates an assumed relatively pure hydrogen stream 116 leaving the primary purification unit 105 as in FIG. 1. Assuming that 70% of the hydrogen was recovered, the CO concentration was set at 200 ppm and the $CH_4$ concentration was set at 800 ppm, with 10 ppm of $CO_2$ and 3 ppm or other non-reactive species such as argon or nitrogen. This composition is representative of the relatively pure hydrogen stream 116. Assuming the initial 100 moles of gas and 74 moles of $H_2$ the relatively pure hydrogen stream has 51.8 moles of $H_2$ at the 70% recovery rate. The hydrogen purity of this stream is only 99.899%, which is acceptable for a fuel cell from a bulk characteristic except for the 200 ppm of CO which would degrade PEM fuel cell performance very rapidly.

To address this issue a methanation reactor 106 is integrated into the system (FIG. 1 or 2). The methanation reaction converts 99.975% of the CO and $CO_2$ into $CH_4$ and $H_2O$ and the outlet conditions are shown in the third block of data (Table 5.C). The $H_2$ concentration has decreased slightly because of the $H_2$ losses, but the output of the methanation reactor 106 is acceptable for direct fuel cell consumption because the CO concentration is 0.05 ppm well below the required 1 ppm level. Actually if only 99.5% of the CO is converted in the methanation reaction the CO concentration would be 1 ppm in the outlet.

The water content after the methanation reaction is 220 ppm, and because the assumed $H_2$ absorbent is a metal hydride, this concentration of water would damage the hydride. The desiccant material removes this water in a process assumed to be 99.99% effective as shown (Table 5.D). As the gas stream flow through the hydride, $H_2$ is absorbed. If 95% of the hydrogen is absorbed, the outlet concentration of $CH_4$ and CO has increased as shown (Table 5.E). The CO level is still approximately 1 ppm and the $CH_4$ concentration has increased from 1010 ppm to 19830 ppm or just under 2%. Since only 95% of the hydrogen is absorbed, the hydrogen concentration is still 98% and 2.59 moles of $H_2$ leave the secondary system with the $CH_4$ and CO. The 49.18 moles of $H_2$ absorbed results in the net $H_2$ recovery being 66.5% (94.9% of the initial 70% value). Assuming that the metal hydride had only a 150 times $H_2$ gas volume to vessel volume, when the desorbed H2 during the next parallel path cycle this volume of $H_2$ is mixed with one volume of absorbent bed inlet gas (with 1010 ppm $CH_4$ and $H_2$ concentration of 99.9%). The result is an $H_2$ purity of 99.9993% after the secondary purification process as shown (Table 5.F).

Figure 6:
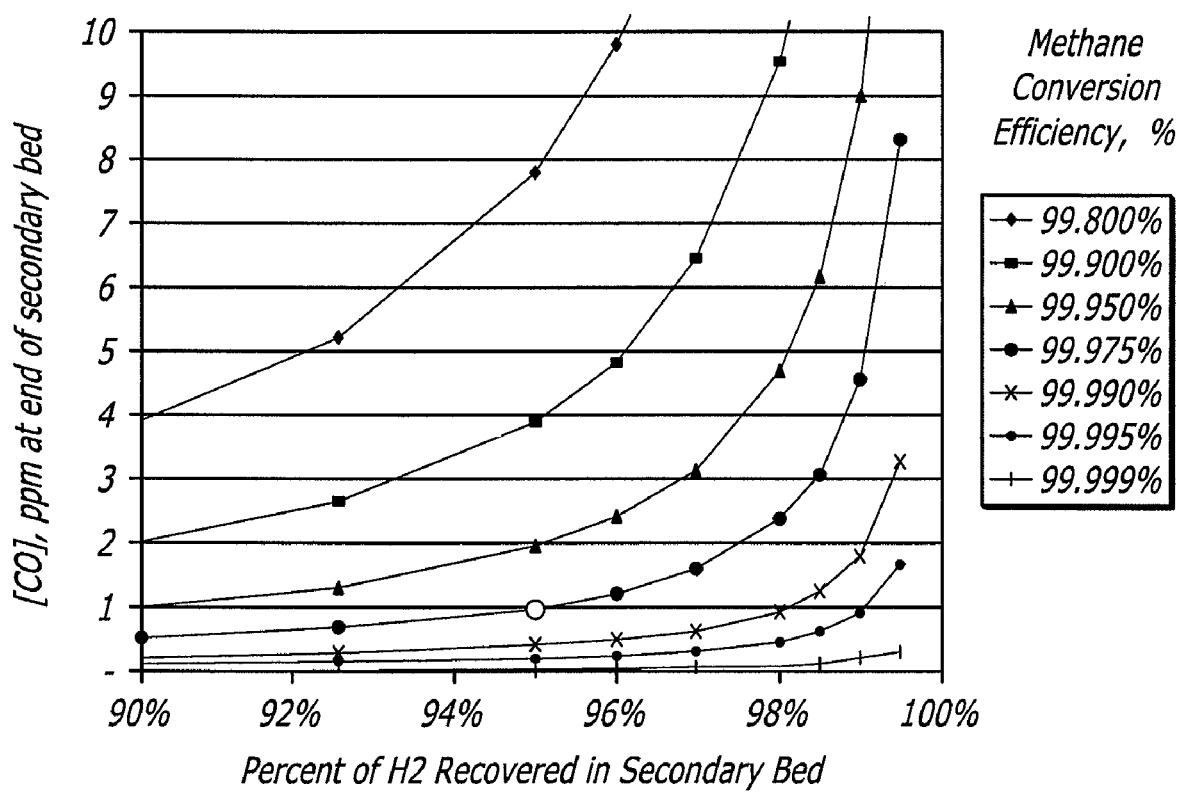
FIG. 6 is a graph of critical CO conversion and hydrogen purity in the purification process shown in FIG. 4.

One aspect of the durability of the secondary purification process 400 is the concentration of CO at the end of the $H_2$ absorbent beds 413 or 463 as the $H_2$ is absorbed. An example of this analysis is presented in FIG. 6 illustrating the CO concentration at the end of the absorption bed as a function of the percent of $H_2$ recovered in the secondary bed (x-axis) and the level of CO conversion in the methanation reactor 106. With decreased activity in the methanation reactor (106) the $H_2$ recovery in the secondary purification process 100 must be decreased to maintain CO concentrations at an acceptable level. If $H_2$ absorbent materials 413 and 463 with higher tolerance to CO are used optimization of these parameters can be adjusted. Higher activity of the methanation reactor 106 is achieved by increasing the temperature of the catalyst. The innovations defined in FIGS. 1 and 2 are needed to passively achieve reactor 106 temperatures without too much system complexity or process inefficiencies.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A hydrogen generation system comprising:
   a fuel reforming reactor generating a hydrogen-rich reformate gas at a temperature greater than 150 C;

a pressure swing adsorption (PSA) hydrogen purification unit that separates the reformate gas into a relatively pure hydrogen stream and an off-gas stream;

a catalytic reactor down stream of the PSA unit that converts carbon monoxide (CO) and hydrogen ($H_2O$) contained in the relatively pure hydrogen stream into methane ($CH_4$) and water vapor ($H_2O$);

a first secondary purification stage downstream of the PSA unit and the catalytic reactor, the first secondary purification stage having a first water adsorbent material bed that adsorbs the $H_2O$ and a first hydrogen absorbent or adsorbent material bed downstream of the first water adsorbent material bed; and a second secondary purification stage downstream of the PSA unit and the catalytic reactor connected in parallel to the first secondary purification stage, the second secondary purification stage having a second water adsorbent material bed that adsorbs the $H_2O$ and a second hydrogen absorbent or adsorbent material bed downstream of the second water adsorbent material bed;

wherein the relatively pure hydrogen stream is selectably connected to one of the first secondary purification stage and the second secondary purification stage.

2. The hydrogen generation system of claim 1 further comprising:

the catalytic reactor being positioned such that the temperature of the hydrogen-rich reformate gas maintains the temperature of the catalytic reactor.

3. The hydrogen generation system of claim 1 further comprising:

a combustion reactor integrated with the fuel reforming reactor that uses the off-gas stream to provide thermal energy to the fuel reforming reactor;

the combustion reactor having a combustion exhaust gas at a temperature greater than 150 C exiting the combustion reactor; and wherein the catalytic reactor is positioned such that the temperature of the exhaust gas maintains the temperature of the catalytic reactor.

* * * * *